(No Model.)
2 Sheets—Sheet 1.
J. THOMSON.
DIFFERENTIAL SCREW.
No. 250,464. Patented Dec. 6, 1881.
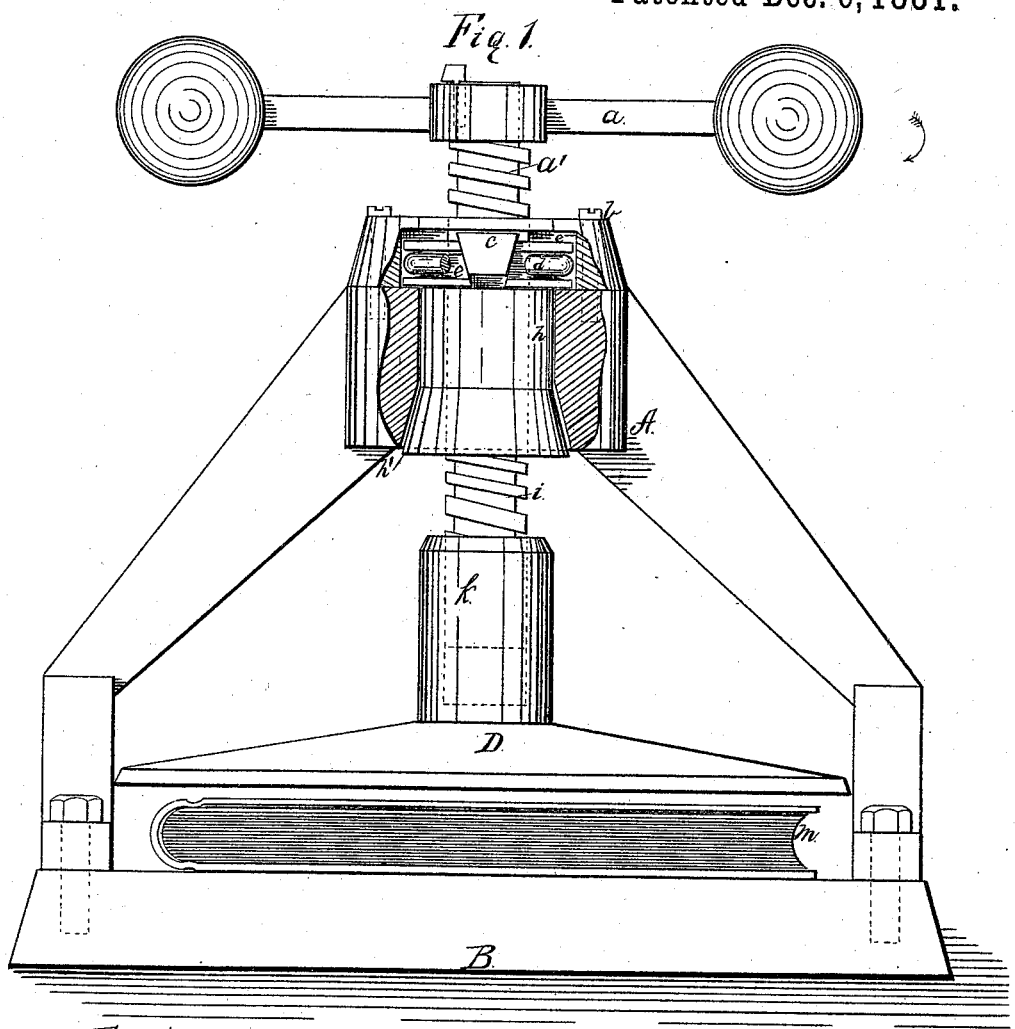
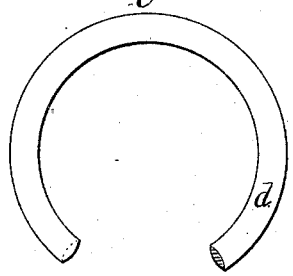
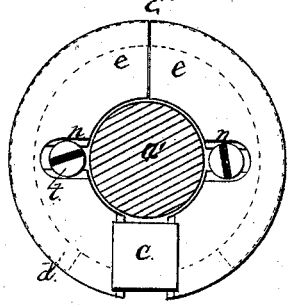
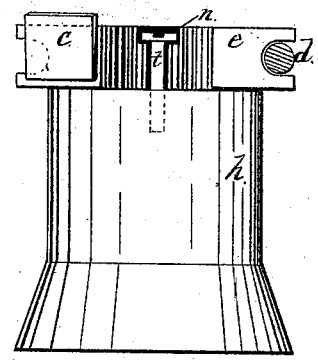
Witnesses:
Herman T. C. Kraus
Lyman H. Essex
John Thomson
Inventor (No Model.) 2 Sheets—Sheet 2.

J. THOMSON.
DIFFERENTIAL SCREW.

No. 250,464. Patented Dec. 6, 1881.

Witnesses;
Geo. H. Graham

Inventor,
John Thomson,
by Munson & Philipp
Att'ys.

UNITED STATES PATENT OFFICE.

JOHN THOMSON, OF BROOKLYN, NEW YORK.

DIFFERENTIAL SCREW.

SPECIFICATION forming part of Letters Patent No. 250,464, dated December 6, 1881.

Application filed May 28, 1881. (No model.)

*To all whom it may concern:*

Be it known that I, JOHN THOMSON, a citizen of the United States, residing in Brooklyn, county of Kings, and State of New York, have invented certain new and useful Improvements in Differential Screws, which improvements are fully described and illustrated in the following specification and accompanying drawings.

The construction and principle of operation of the ordinary differential screw are so well known as to require no specific description. The advantage gained by the use of this screw is that its power is practically unlimited, or limited only by the strength of the material. This great power is, however, gained only by a proportionate loss of time.

There are many machines—such as presses, vises, &c—in which it is necessary to move one of the parts a comparatively long distance without encountering any considerable resistance, and then a very short distance against very great resistance. In these machines if a simple screw is used the operator is often unable to exert the power which is desirable. If, on the other hand, an ordinary differential screw is used, then the acting part must be moved through the entire length of its travel by the slow action of this screw, and although great power will be gained the loss of time is such as to render the use of this screw impracticable. Another disadvantage which attends the use of an ordinary differential screw in this class of machines is that in order to obtain any considerable range of motion the parts must be made comparatively long, which makes the device both cumbersome and expensive.

It is the object of my invention to overcome these difficulties and to produce a screw which, when running free, will have the rapidity of action of a simple screw, and when working against resistance will have the great power of a differential screw. To this end I have made a screw which, when running free, acts with the quick flow of a simple screw, but which, when working against resistance, is converted by means of certain clutch mechanism into a powerfully acting differential screw.

Figure 5:
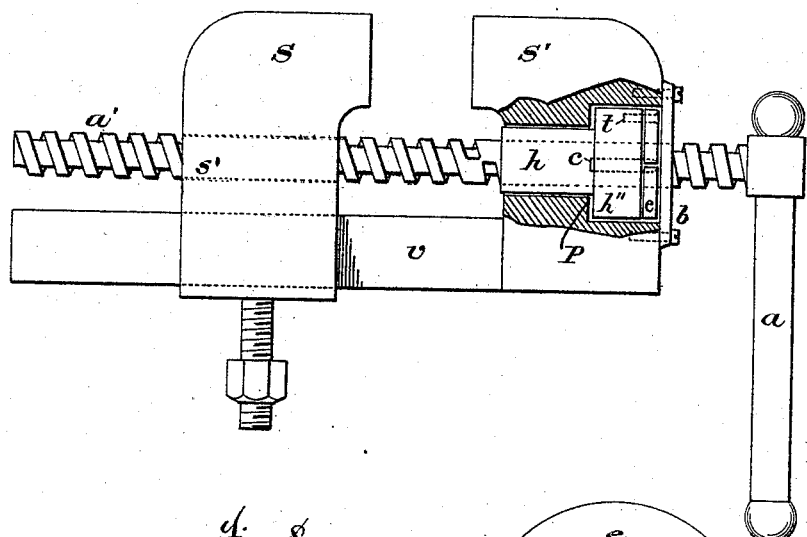

In said drawings, Figure 1 is a side elevation, partly in section, of a copying-press provided with one form of screw embodying my invention. Fig. 2 is a plan view of the automatic clutch. Fig. 3 is an elevation of the loose nut through which the screw works, one-half of its automatic clutch being removed. Fig. 4 represents the clutch-spring. Fig. 5 is a side elevation, partly in section, of a vise provided with another form of screw embodying my invention. Figs. 6, 7, 8, 9, and 10 illustrate modified forms of clutches, and the latter a third form of screw embodying my invention.

In Fig. 1, B is the belt, D the platen, and A the bridge or beam, of an ordinary copying-press. $a'$ is the screw by which the press is operated.

In presses of this class as ordinarily constructed the screw, which is a simple one, works through a nut formed in the bridge, and is attached to the platen by a swivel-connection.

The press here shown is provided with my improved differential screw, which will now be described.

The screw $a'$ is made in one piece and provided upon its upper and lower parts with threads of different pitches, that from $i$ to the top being finer than that from the same point to the bottom. The lower part of the screw works in the nut K, fixed to the platen by which the latter is raised and lowered. $h$ is another nut, through which that portion of the screw having the finer pitch passes. This nut $h$ is provided at its upper end with an automatic clutch, (the details of which will be explained presently,) which normally clutches the nut to the screw, so that both revolve together. The clutch extends beyond the edge of the nut, as clearly shown in Figs. 1 and 3, thus forming a flange which supports the moving parts by resting upon the edge O of the opening through the bridge. If, now, the hand-lever $a$ be moved to the left, the nut $h$ turning, as it will, with the screw, the platen will be lowered quickly by the action of the simple screw working in the nut K. This will continue until the platen D reaches and presses the book-rim.

It is evident that as soon as the platen D impinges upon the book-rim the action of the screw will raise the nut $h$ until its enlarged lower end, $h'$, wedges tightly into the corresponding-shaped bearing P in the beam A, the clutch being simultaneously released. This will prevent the further revolution of the nut $h$, and the further pressure upon the book will be applied by the differential screw, composed of the coarse thread, working in the nut $k$, which forces the platen down, and the finer thread, working in the nut $h$, which backs the screw out of the bridge to which said nut is then secured.

As before stated, the clutch which clamps the nut $h$ to the screw-shaft is made to release its hold at the same instant that the nut is clamped in its bearings. This releasing is accomplished automatically by the following devices: The clutch which holds the nut $h$ to the screw is composed of two separable parts, $e\ e$, semicircular in form and cut out in the center to embrace the screw. (See Fig. 2.) These parts are held to the top of the nut by small screws or pins passing through slots $n$, which are of sufficient size to allow the two parts of the clutch to work in and out freely. These parts are forced inward so as to grasp the screw-shaft by means of the annular spring $d$, which rests in a groove in the outer edge of the clutch. At one of the points where the parts $e\ e$ come together their ends are beveled, so as to form a V-shaped recess, in which rests loosely the wedge $c$, with its head resting against the cap or casing $b$. When the nut $h$ is elevated the wedge $c$ will be forced between the ends of the parts $e\ e$, thus separating them and releasing the hold of the clutch upon the screw.

It is to be observed that the nut $h$ has just sufficient vertical movement to allow the wedge $c$ to act so as to release the clutch $e\ e$ at the same instant that the rotation of the nut is arrested. When the hand-lever $a$ is reversed the platen is raised by the differential screw until the pressure upon the book becomes so reduced that the nut $h$ can drop, when the clutch again takes hold on the screw-shaft, and the device becomes a simple screw.

Figure 6:
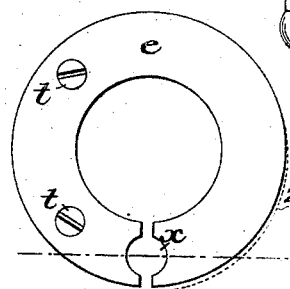

Fig. 5 shows another form of my improved screw, and also the application of my invention to an ordinary machinist's vise. I have also shown a nut and clutch of a slightly modified construction. The nut, instead of having a beveled projection, as shown in Figs. 1 and 3, is provided with a square shoulder, $h''$. The clutch $e$ is also of a somewhat modified form. Instead of being made in two pieces, it is of a single piece, in the form of a ring, and divided at one point, as shown in Fig. 6. One side of this ring is secured firmly to the head of the nut by screws or pins $t$, the other being left free. At the point where the ring is divided it is provided with a conical opening, $x$, in which operates the point of the conical wedge $c$, which passes through and projects beyond the head of the nut $h$. (See Fig. 7.) The ring $e$ is of spring metal, and normally clutches the screw and holds the nut fast, so that it revolves with the said screw. When the movable jaw S', in advancing, meets with resistance the projecting end of the wedge $c$ will be pressed against the shoulder P of said jaw, and the conical end will thus be forced into the opening $x$ in the clutch and cause it to spread, as shown by dotted line Z, Fig. 6. This spreading will cause the clutch to release its hold upon the screw, and the shoulder $h''$ of the head of the nut will be pressed against the shoulder P, and the nut becomes locked. The finely-threaded portion of the screw will then begin to act in the nut $h$, and the whole will be a differential screw and have the operation described in connection with Fig. 1. When the jaws are separated by a reverse movement the cap $b$ serves to confine the parts in place, as before explained.

It is to be observed that the inclination given to the wedge and to the ends of the clutch should be so proportioned as to cause the wedge to be readily forced out from between the ends of the clutch by their elastic pressure.

Figure 8:
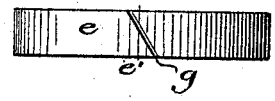

Fig. 8 shows a clutch, $e$, of still another construction. In this case it is made of a simple spring-ring, secured to the nut in the manner shown in Figs. 6 and 7, but is divided at one point by a diagonal cut, $g$. This clutch can be operated by a pin passing through the head of the nut and pressing against the shoulder P and the ring $e$ at the point $e'$, the angular ends at $g$ acting as a wedge to force the clutch open.

Figure 9:
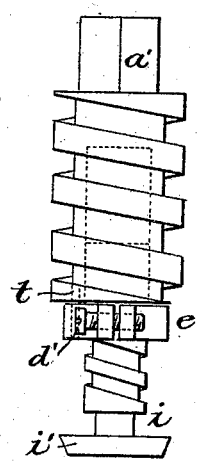
Figure 7:
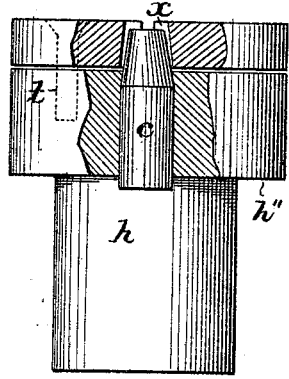

Fig. 9 shows an ordinary telescoping differential screw, with a clutch attachment, $e$, applied to make it operate upon the principle of my invention. The clutch $e$ is in this case secured to the screw $a'$ by screws or pins $t$, in the manner already described; but, instead of clutching the screw $i$ by spring-pressure, the friction is applied by means of the adjusting-screw $d'$. In this way the screw $a'$ will act singly until the resistance on the head $i'$ causes sufficient friction at that point to overcome the friction of the clutch, when the action will gradually change from the simple to the differential screw.

The spring-clutch hereinbefore described may also be used upon this kind of a screw with slight modifications of the parts. One such adaptation would be a clutch substantially such as is shown in Fig. 6. In this case the clutch is simply attached to the end of the coarser screw by a holding screw or pin, $t$, and will operate substantially as does the clutch in Fig. 9. Whatever loss in range of motion occurs from repeated use may be compensated for by slight adjustment.

Among other advantages derived from my invention arises this, that the coarser screw, not being required to exert great pressure when performing the office of bringing the clamping parts together, may have a very coarse pitch and consequent quick throw.

Having thus described my invention, what I claim as new, and desire to secure by Letters Patent, is—

1. A screw for presses, vises, &c., which, under the conditions described, can be made to change from a simple to a differential screw, and vice versa, substantially as described.

2. A screw for presses, vises, &c., which, under the conditions described, automatically changes from a simple to a differential screw, and vice versa, substantially as described.

3. The combination of the fine and coarse pitch screws, the nuts K and h, and the clutch e, substantially as described.

4. The combination of the fine and coarse pitch screws, the nuts K and h, and the automatic clutch e, substantially as described.

5. The combination of the single shaft provided with the fine and coarse pitch screws, the two nuts, and the clutch e, substantially as described.

6. The combination of the screw, the nut h, and the clutch e, substantially as described.

7. The combination of the screw, the nut h, clutch e, and wedge c, substantially as described.

8. The combination of the screw, the nut h, and the bearing for locking said nut, substantially as described.

9. The combination of the screw, the nut h, the clutch e, wedge c, cap b, and the bearing to clutch the nut, substantially as described.

10. The combination, with the screw and the nuts K and h, of the clutch consisting of two spring-seated separable parts and a wedge, as c, substantially as described.

JOHN THOMSON.

Witnesses:
LYMAN H. ESSEX,
HERMAN T. C. KRAUS.